Feb. 1, 1949.  G. M. GODSHALL  2,460,691
HOT WATER HEATING UNIT
Filed April 23, 1946  2 Sheets-Sheet 1
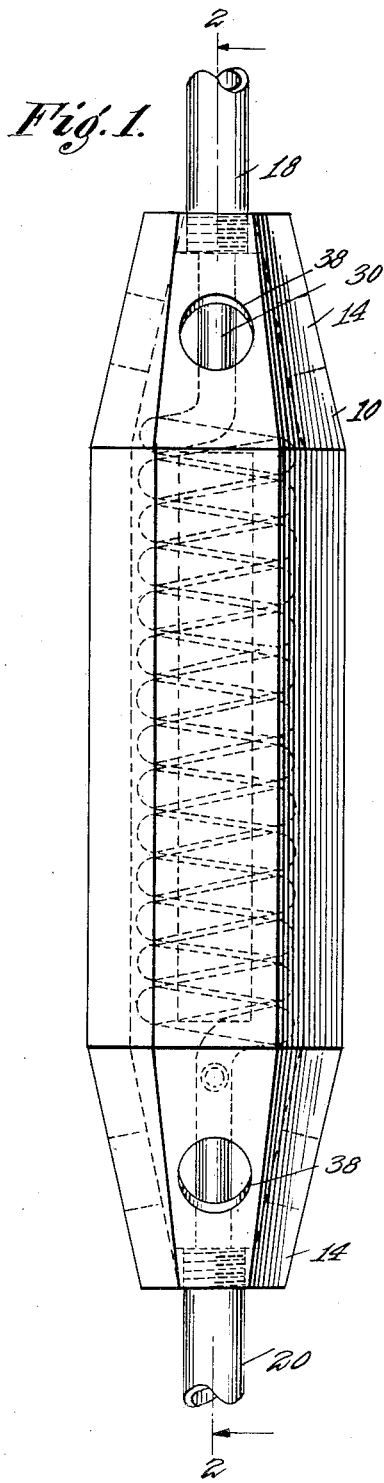
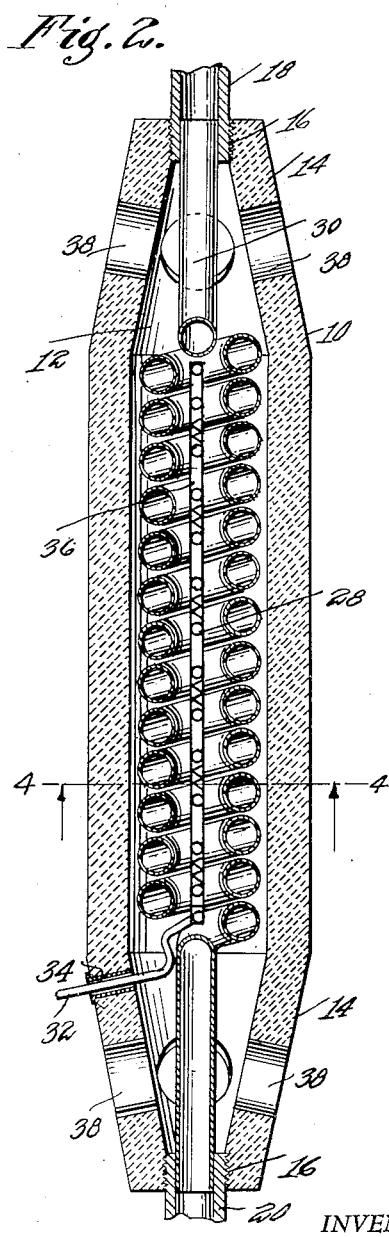
INVENTOR.
GEORGE M. GODSHALL.
BY *Victor J. Evans & Co.*
ATTORNEYS Feb. 1, 1949.  G. M. GODSHALL  2,460,691
HOT WATER HEATING UNIT
Filed April 23, 1946  2 Sheets-Sheet 2
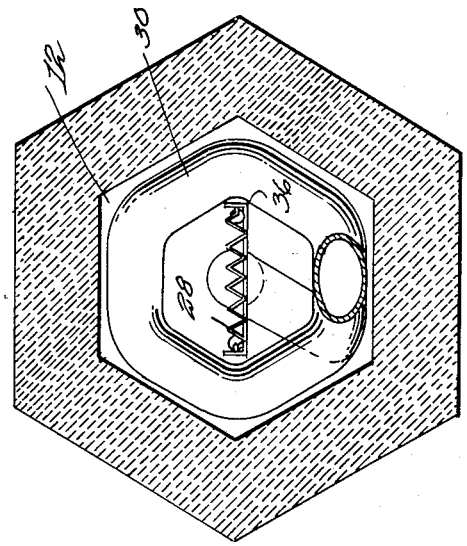
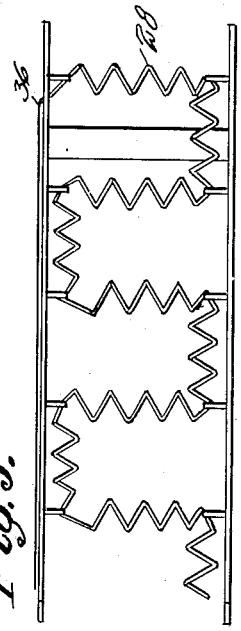
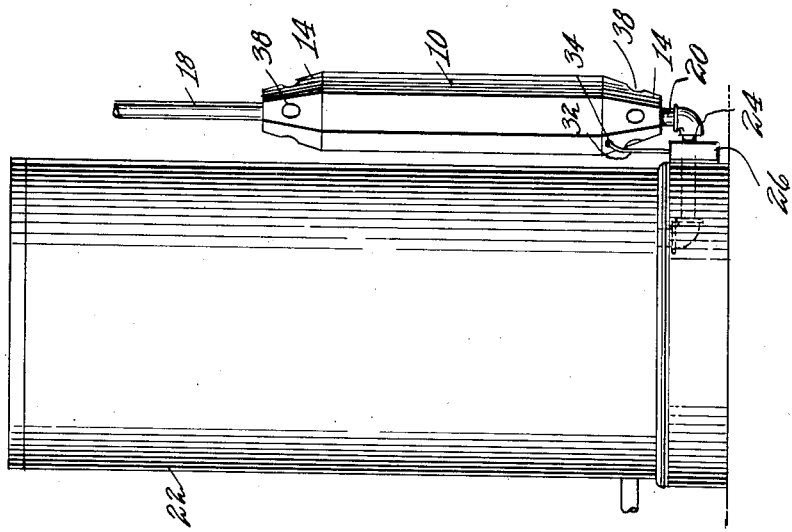
INVENTOR.
George M. Godshall.
BY Victor J. Evans & Co.
ATTORNEYS Patented Feb. 1, 1949

2,460,691

UNITED STATES PATENT OFFICE 2,460,691

HOT-WATER HEATING UNIT

George M. Godshall, Leonardo, N. J.

Application April 23, 1946, Serial No. 664,376

1 Claim. (Cl. 219—39)

This invention relates to a hot water heating unit which is especially adapted to be operated by electricity, natural gas, manufactured gas or bottled gas.

An object of the invention is to provide a heater which is adapted to be connected to the pipes leading to a boiler for hot water and controlled by a thermostat for the heating of the water in the boiler.

Another object of the invention is to provide a heater that is simple in construction, compact and durable in use, easy to install, efficient in operation and economical to operate and manufacture.

With the above and other objects in view the invention consists of the novel details of construction, arrangement and combination of parts more fully hereinafter described, claimed and illustrated in the accompanying drawings in which:

Figure 1 is an elevational view of an embodiment of the invention;

Figure 2 is a sectional view on the line 2—2 of Figure 1;

Figure 3 is an elevational view of an embodiment of the invention as applied to a water boiler;

Figure 4 is a sectional view on the line 4—4 of Figure 2 and

Figure 5 is a diagrammatic view of the heating coil of the invention.

Referring more in detail to the drawings the reference numeral 10 designates the hexagon shaped housing, which is made from Alfrax BI refractory brick and is provided with the longitudinal complementary shaped chamber 12 formed therein. The ends 14 are tapered inwardly toward the medial line of the housing and are provided with the threaded bores 16 for reception of the inlet and outlet pipes 18 and 20 respectively.

The inlet pipe 18 being connected to any source of water and the outlet pipe 20 being connected to the boiler 22 by suitable pipe connections 24 in which is interposed the thermostat 26 for control of the electrical heating unit 28.

The pipes 18 and 20 are connected to a water coil 30 which conforms in shape to the chamber 12 and the heating unit 28 is mounted within the coil and provided with the lead 32 for connection to the thermostat 26. The lead 32 is mounted in the insulated opening 34 in the housing 10. The heating unit 28 being carried by the support 36.

The tapered ends 14 of the housing 10 are provided with apertures 38 which will in the event a gas heating element is installed in place of the electrical heating unit permit air to enter the housing for the combustion of the gas from the heater.

The installation is made as shown in Figure 3, with the tank 22 and the water will be heated before it enters the tank. Thus a heater has been provided that will efficiently heat the water and produce sufficient water for household purposes by control of the thermostat which will maintain the heating coil at a predetermined temperature at all times.

It is believed that the operation, construction and advantages of the invention will be apparent to those skilled in the art and it is to be understood that changes in the details of construction, arrangement and combination of parts may be resorted to provided they fall within the spirit of the invention and the scope of the appended claim.

Having thus described the invention what is claimed as new and desired to be secured by Letters Patent is:

A device of the character described, comprising a hexagonal shaped housing formed of refractory brick, a complementary shaped chamber in said housing, a hexagonal shaped coil in said housing, inlet and outlet pipes connected to said housing and to said coil, electrical heating means mounted in said housing intermediate of said coil, a support in said housing for mounting said heating means thereon, tapered ends on said housing and diametrical apertures in said tapered ends to admit air into said housing.

GEORGE M. GODSHALL.

REFERENCES CITED

The following references are of record in the file of this patent:

UNITED STATES PATENTS

| Number | Name | Date |
|---|---|---|
| Re. 19,175 | Fichtner | May 22, 1934 |
| 1,177,255 | Lawrence | Mar. 28, 1916 |
| 1,408,634 | Passmore et al. | Mar. 7, 1922 |
| 1,620,745 | Wainwright | Mar. 15, 1927 |
| 1,671,677 | Keeton | May 29, 1928 |